United States Patent
Wang et al.

(10) Patent No.: US 12,407,654 B2
(45) Date of Patent: Sep. 2, 2025

(54) SYSTEM AND METHOD FOR FIREWALL POLICY RULE MANAGEMENT

(71) Applicant: Morgan Stanley Services Group Inc., New York, NY (US)

(72) Inventors: Hongliang Wang, Singapore (SG); Rongfeng Zhou, Singapore (SG); Jack Suzuki, Tokyo (JP); Jun Wu, Shanghai (CN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/776,556

(22) Filed: Jul. 18, 2024

(65) Prior Publication Data

US 2025/0007884 A1 Jan. 2, 2025

Related U.S. Application Data

(63) Continuation-in-part of application No. 18/461,417, filed on Sep. 5, 2023, now Pat. No. 12,224,986, which is a continuation of application No. 18/344,274, filed on Jun. 29, 2023, now abandoned.

(51) Int. Cl.
*H04L 9/40* (2022.01)

(52) U.S. Cl.
CPC ...... *H04L 63/0263* (2013.01); *H04L 63/0236* (2013.01)

(58) Field of Classification Search
CPC .................. H04L 63/0263; H04L 63/0236
See application file for complete search history.

(56) References Cited

U.S. PATENT DOCUMENTS

| | | |
|---|---|---|
| 6,460,141 B1 | 10/2002 | Olden |
| 6,834,301 B1 | 12/2004 | Hanchett |
| 7,676,836 B2 * | 3/2010 | Prigent ............... H04L 63/0227 726/13 |
| 7,991,899 B2 | 8/2011 | Schmidt |
| 8,904,511 B1 | 12/2014 | O'Neill |
| 10,157,290 B1 | 12/2018 | Sinha |
| 11,570,148 B2 | 1/2023 | Liu et al. |
| 2003/0021283 A1 | 1/2003 | See et al. |
| 2003/0177389 A1 | 9/2003 | Albert |
| 2005/0177829 A1 | 8/2005 | Vishwanath |

(Continued)

OTHER PUBLICATIONS

Notice of Allowance for U.S. Appl. No. 18/461,417 dated Nov. 21, 2024.

*Primary Examiner* — Vance M Little
(74) *Attorney, Agent, or Firm* — PEARL COHEN ZEDEK LATZER BARATZ LLP

(57) ABSTRACT

A system and method for updating network policies may include determining, from a set of hosts, a subset of hosts to have network policies updated; for each host in the subset of hosts, determining a set of policies relevant to the host, and determining a difference between the set of policies relevant to the host and a set of policies relevant to the host determined at an earlier time; and for each of the subset of hosts, installing the set of policies relevant to the host. The difference may be calculated or determined by comparing a file containing the set of policies relevant to the host, and a file containing the set of policies relevant to the host determined at an earlier time, e.g. determined the prior calendar day.

20 Claims, 7 Drawing Sheets

(56) References Cited

U.S. PATENT DOCUMENTS

| | | | |
|---|---|---|---|
| 2007/0271592 A1* | 11/2007 | Noda | H04L 9/3234 |
| | | | 726/1 |
| 2008/0104661 A1 | 5/2008 | Levin | |
| 2009/0288135 A1 | 11/2009 | Chang et al. | |
| 2013/0227109 A1 | 8/2013 | Crudele | |
| 2014/0297774 A1* | 10/2014 | Munupalle | H04L 41/0889 |
| | | | 709/208 |
| 2015/0324589 A1 | 11/2015 | Thanos | |
| 2018/0027006 A1 | 1/2018 | Zimmermann et al. | |
| 2018/0343236 A1 | 11/2018 | Pillay-Esnault | |
| 2020/0177548 A1 | 6/2020 | Devarajan et al. | |
| 2020/0296007 A1 | 9/2020 | Finn, II et al. | |
| 2020/0336513 A1 | 10/2020 | Martin | |
| 2020/0374268 A1 | 11/2020 | Wyatt et al. | |
| 2021/0136039 A1 | 5/2021 | Jin et al. | |
| 2021/0273977 A1 | 9/2021 | Karasaridis et al. | |
| 2022/0078619 A1 | 3/2022 | Mahamkali | |
| 2022/0109701 A1 | 4/2022 | Zeng et al. | |
| 2022/0166756 A1* | 5/2022 | Gupta | H04L 41/16 |
| 2022/0191248 A1 | 6/2022 | Pieczul et al. | |
| 2022/0286379 A1 | 9/2022 | Hofer et al. | |
| 2023/0042610 A1 | 2/2023 | Barton et al. | |
| 2023/0099259 A1 | 3/2023 | Kulaga et al. | |
| 2023/0156812 A1 | 5/2023 | Yang et al. | |

* cited by examiner ly to the scalable firewall

SYSTEM AND METHOD FOR FIREWALL POLICY RULE MANAGEMENT

RELATED APPLICATION DATA

The present invention is a continuation-in-part of prior U.S. application Ser. No. 18/461,417, filed Sep. 5, 2023, entitled "SYSTEM AND METHOD FOR FIREWALL POLICY RULE MANAGEMENT", which in turn is a continuation of prior U.S. application Ser. No. 18/344,274, filed Jun. 29, 2023, entitled "SYSTEM AND METHOD FOR FIREWALL POLICY RULE MANAGEMENT", each of which is incorporated herein by reference in its entirety.

FIELD OF THE INVENTION

The present invention relates generally to firewall policy and rule management; for example to a scalable firewall policy and rule management solution.

BACKGROUND OF THE INVENTION

Computer systems and technologies exist to provide network segregation, e.g., in an enterprise according to security, business or other requirements. In an environment or enterprise with tens or hundreds of thousands of computer hosts, such a network segregation requirement could result in millions of different network firewall policies or rules to manage. Hosts may be, e.g. end user computers (e.g. a desktop or laptop computer used by an enterprise employee), or servers, firewalls, or other computers operated by the enterprise. Each of these hosts may use hundreds or thousands of rules or policies, each rule or policy allowing, on a packet basis, connection (e.g. computer data exchange, communication or connection) to one other host: the default for hosts in such systems may be no connection is allowed to another specific host unless a specific rule allows for it. Each host may include an individually designed combination of rules or policies, each allowing for a connection from the host to another host; a single host may need to install a huge amount of network rules or policies. An installation or update of firewall rules or policies may cause problems in the affected hosts or network, and it may be difficult to diagnose problems caused by the installation or update of rules or policies, or identify which portions of the update or which rules cause the problem.

Computer hosts may include virtual machines (VMs), and in some organizations hundreds or even thousands of VMs may be added or created and decommissioned every day. This may mean that the list of Linux or other hosts that need firewall rules is not static, but is dynamic. However, certain assumptions may hold, for example: 1) if a host needs firewall policy today, then it likely still needs a firewall policy tomorrow, e.g., the host is either newly created or still in use (although a firewall policy for a host may change day-to-day, or overnight); and 2) if a host does not need firewall policy today, then it likely will not need it tomorrow e.g., the host is decommissioned.

SUMMARY OF THE INVENTION

A system and method may update network policies by determining, among a set of hosts, a subset of hosts to have network policies updated; for each host in the subset of hosts, determining a set of policies relevant to the host; and for each of the subset of hosts, installing the set of policies relevant to the host. The subset of hosts may be determined based on a category or division such as the time zone corresponding to the location of each host in the subset of hosts. The policies relevant to the host may be received from a database and saved to a file with the set of policies relevant to the host; the host may then access the file.

A system and method for updating network policies may include determining, from a set of hosts, a subset of hosts to have network policies updated; for each host in the subset of hosts, determining a set of policies relevant to the host, determining a difference between the set of policies relevant to the host and a set of policies relevant to the host determined at an earlier time; and for each of the subset of hosts, installing the set of policies relevant to the host. The difference may be calculated or determined by comparing a file containing the set of policies relevant to the host, and a file containing the set of policies relevant to the host determined at an earlier time, e.g. determined the prior calendar day.

Maintaining a difference between a prior rule or firewall installation and a current installation (e.g. a difference in the state of a firewall between the period before and after an update) may allow the diagnosis of problems caused by the installation: for example, if the difference shows a set of rules (being a subset of all rules installed) were different between a certain day's update and a previous update, investigators may focus their diagnosis efforts on those rules that are different.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

Figure 1:
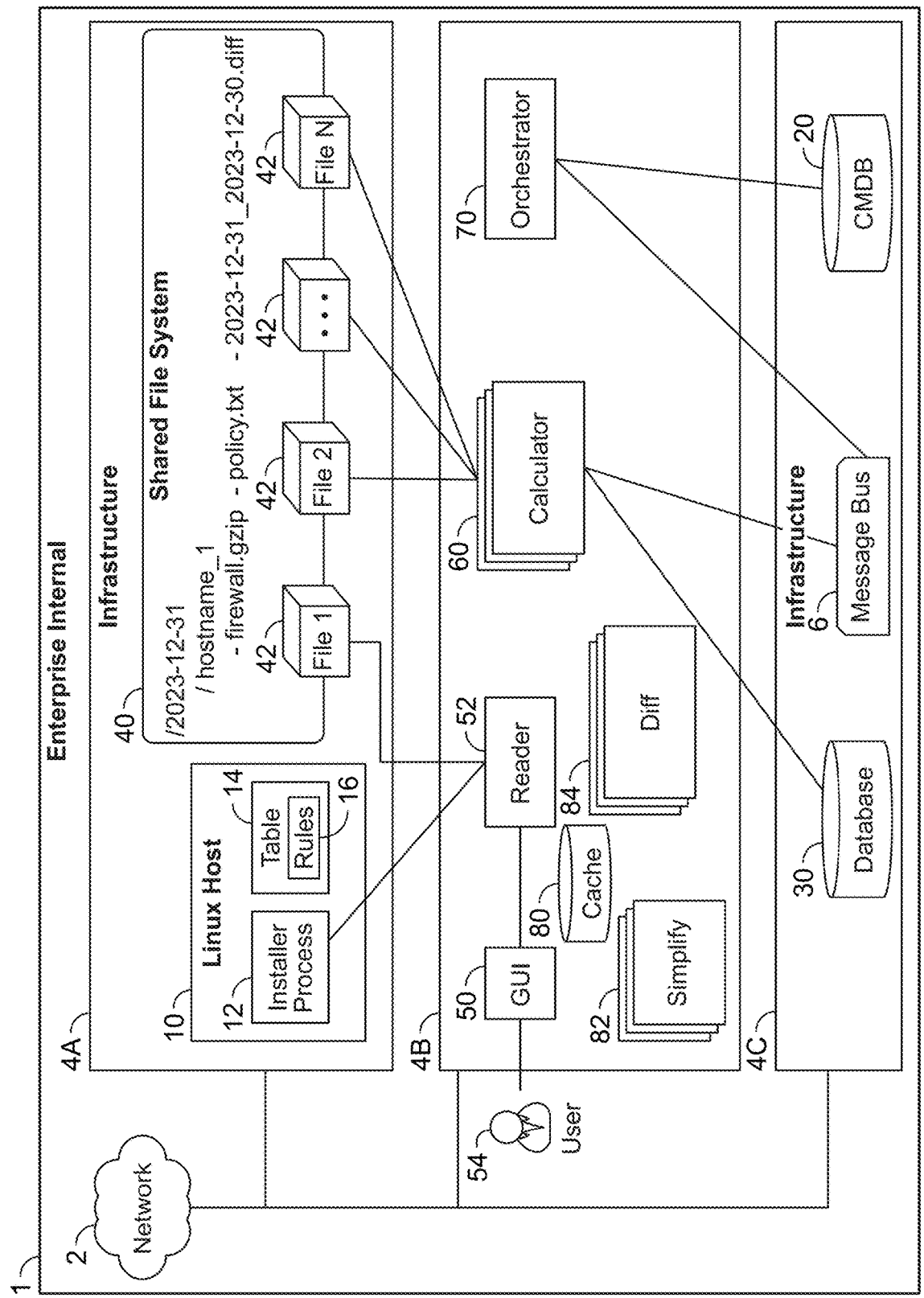
FIG. 1 depicts a policy management system for a number of hosts in an enterprise, according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments may divide, by time and by processing unit, the process of distributing network rules or policies from a central database to a large number of hosts (e.g. user computers, network devices, etc.) in an organization. One or more processes may determine, among the organization hosts, a subset to have network policies updated (e.g., a subset may be all hosts in a certain time zone, or another category of hosts), and for each of these selected hosts, may determine policies relevant or to be applied to each of the subset and store these policies, e.g. in a file, e.g. one file per host. Each host may then access its file and use the rules or policies in the file to update its network policies. In some embodiments, different processes or computers may perform the different tasks, improving such technology and resulting in scalability and the ability to perform this large task in parallel: e.g. a first process or device may determine the subset; one or a set of processes may access the policies for each host from a database and save to files; and another process may access the files on behalf of the host. In different embodiments the tasks need not be divided as in the examples provided herein.

FIG. 1 depicts a policy management system for a number of hosts in an enterprise, according to embodiments of the present invention. Referring to FIG. 1, an enterprise 1 may include a number of hosts 10 (only one is shown for clarity), e.g. a server, firewall, user computer may include an installer agent or process 12 and a table 14, e.g. an IPTable storing policies or rules 16, e.g. Linux or other policies. Rules 16 may be used by firewall enforcement software to enforce a firewall relevant to the host on which they are installed, or to perform other tasks or enforcement. While one host 10 is shown for clarity, many hosts, e.g. many thousands, may be associated with or part of an organization or company. Installer process 12 may be an agent executing on host 10 with sufficient privilege (e.g., install privilege) to install or update policies or rules into table 14 when required (which may cause installation of policies to the associate host). An enterprise or other organization may include many, e.g. tens or hundreds of thousands, of hosts. CMDB (configuration management database) 20 may store information about hardware and software assets (commonly referred to as configuration items) including information describing hosts 10. For example, CMDB 20 may store, for each of hosts 10 (e.g. the hosts in an enterprise), information such as hostname and location. Database 30 may store user-defined-network-policies, including rules and policies. Rules and policies in database 30 may be indexed to or associated with, in database 30, hostnames, each hostname associated with a host 10. One or more calculator services or processes 60 may access database 30 to determine a set of policies relevant to, to be applied to, or associated with a specific host, receive or extract policies or rules relevant to that host, create or maintain directories to store policies, and create a network policy file 42 (or other suitable data object) storing those policies. Calculator services 60 may be distributed geographically across enterprise infrastructure, but may be centrally located. Calculator services 60 typically work closely with database 30; if database 30 has a replica in a region then a calculator service 60 may be geographically distributed to that region. Each file 42 may be compressed. Orchestrator 70 may identify or determine which hosts, e.g. a subset of hosts from the set of hosts associated with an enterprise or organization, are to have network policies or rules updated at a specific time or time period (e.g., based on the time zone of the hosts, or another characteristic of the hosts). Shared file system 40 may include sufficient space to store files 42.

A cache 80 may perform services such as determining if policies for a certain host have been calculated in the past. Simplify services 82 may remove or strip away rule information not needed for certain functionality. Diff services 84 may compare policies or rules to determine a difference between a set of policies and a prior period set of policies. For example, diff services 84 may each compare a file containing the set of policies relevant to a specific host, and a file containing the set of policies relevant to that host determined at an earlier time.

In one embodiment, shared file system 40 is organized using a directory structure where the names of the directories and files indicate the time period relevant to the stored policies (e.g. 2023 Dec. 31 being the example name of a directory storing policies created on Dec. 31, 2023) and/or the host for which the policies are relevant (e.g. hostname_1 being the example name of a directory storing policies relevant to a host named hostname_1). The directory storing rules or policies indexed for or relevant to a certain host may be indexed or described by that host, and may also be indexed or described by the time period (e.g. a cycle time period) relevant to the policies. A directory may include a set of files including, for example a file indicating policy differences between policies created in a most recent time period and those created in a previous time period. In another embodiment, such a directory structure need not be used. For example, each file 42 may be a temporary file created by a calculator process 60, as described herein, storing policies extracted from database 30 and relevant to a specific host 10.

Shared file system 40 may be shared among entities such as calculator services 60 and reader service 52, and other entities such as some system administrators. Reader service 52 and other entities such as system administrator may have read-only access to each file 42.

In some embodiments, a file 42 created for a host persists for a certain fixed amount of time (e.g. 24 hours), and then is deleted, and not reused for another host; however, different embodiments may use other methods of using such files. For example, a calculator service may perform calculations at 1:00 AM local time for a host, and an installer agent may install at 2:00 AM local time. In such a system, the host file may be refreshed every 24 hours. In other embodiments files 42 and other files such as difference files may persist for a longer period of time.

A reader service or process 52 may be used by agent or process 12 to fetch or access the network policy file associated with the host executing agent 12, e.g. from the shared file system. In FIG. 1 one host 10 is shown using reader service 52 to access one file 42; in practice many hosts may each use a reader service to access a network policy file 42 concurrently.

Hosts as used herein may be computers (e.g. desktops, servers, laptops, smartphones, etc.) and may be Linux hosts, e.g. operating the Linux system; however, systems other than Linux may be used.

While data flows or connections in FIG. 1 are indicated by lines with arrows, in general the various entities in FIG. 1 such as hosts 10 and reader service or process 52 may communicate and exchange data via networks 2, such as intranets (in some embodiments networks 2 do not include the Internet, as communications are typically internal to an organization; however in other embodiments the Internet may be used). Further, entities in FIG. 1 may exchange data on message bus 6, for instance, the Apache Kafka event store and stream processing platform; message bus 6 may make use of networks 2. For example, message bus 6 may be used to communicate identities of a subset of hosts to have network policies updated.

One or more servers such as servers 4A (e.g. hosting a shared file system), 4B (e.g. hosting calculator, cache, simplify, diff and orchestrator processes) and 4C (e.g. hosting databases and a message bus) may host and execute processes such as shared file systems, calculators, orchestrators, databases, etc. While specific elements of FIG. 1 are hosted by specific servers, in other embodiments, such elements may be hosted by other servers, in cloud based systems, etc.

Each host 10 may be configured such that communication with another host or computer is not permitted unless a specific rule of rules 16 permits communication, e.g. an exchange of packets, with a specific host or computer. Table 14 may be a table or other data structure (or multiple tables or data structure), accessed by a user-space utility program that allows a user or system administrator to configure rules 16 such as IP packet filter rules for the host, e.g. the rules of a Linux kernel firewall for the host, but may be another type of rule storage structure, and need not use the Linux environment. Rules 16 may be in one or more tables 14, and may tell the host's system how to treat network traffic packets. A host may include many, e.g. thousands of, rules 16. Each of rules 16 may enable connection to another host, or provide another function, and may take the form of, for example—A OUTPUT-p tcp-d 1.2.3.4/23-j ACCEPT.

Rules 16 may govern connections between computers, or user or other log in procedures, such that a mistaken or misguided rule installation may, in the case of high network traffic, prevent logins or cause disk full conditions. Rules 16 may govern connections between applications and hosts: for example, an app executing on host A connecting to computer B may correspond to a rule allowing for this, and a mistakenly installed rule or erroneous rule may prevent such a connection. Other rule formats may be used.

Installer process 12 may be subject to restrictions such as it is only allowed to execute at certain times (e.g., at 2:00 AM local time for its associated host) so that it has least impact on user's daily work.

A user 54 may use GUI (graphical user interface) 50 to access reader process 52 to review rules or policies assigned to a host. The user may enter the specified hostname into GUI 50 which may contact reader service or process 52 to fetch the corresponding file from the shared file system.

Figure 7:
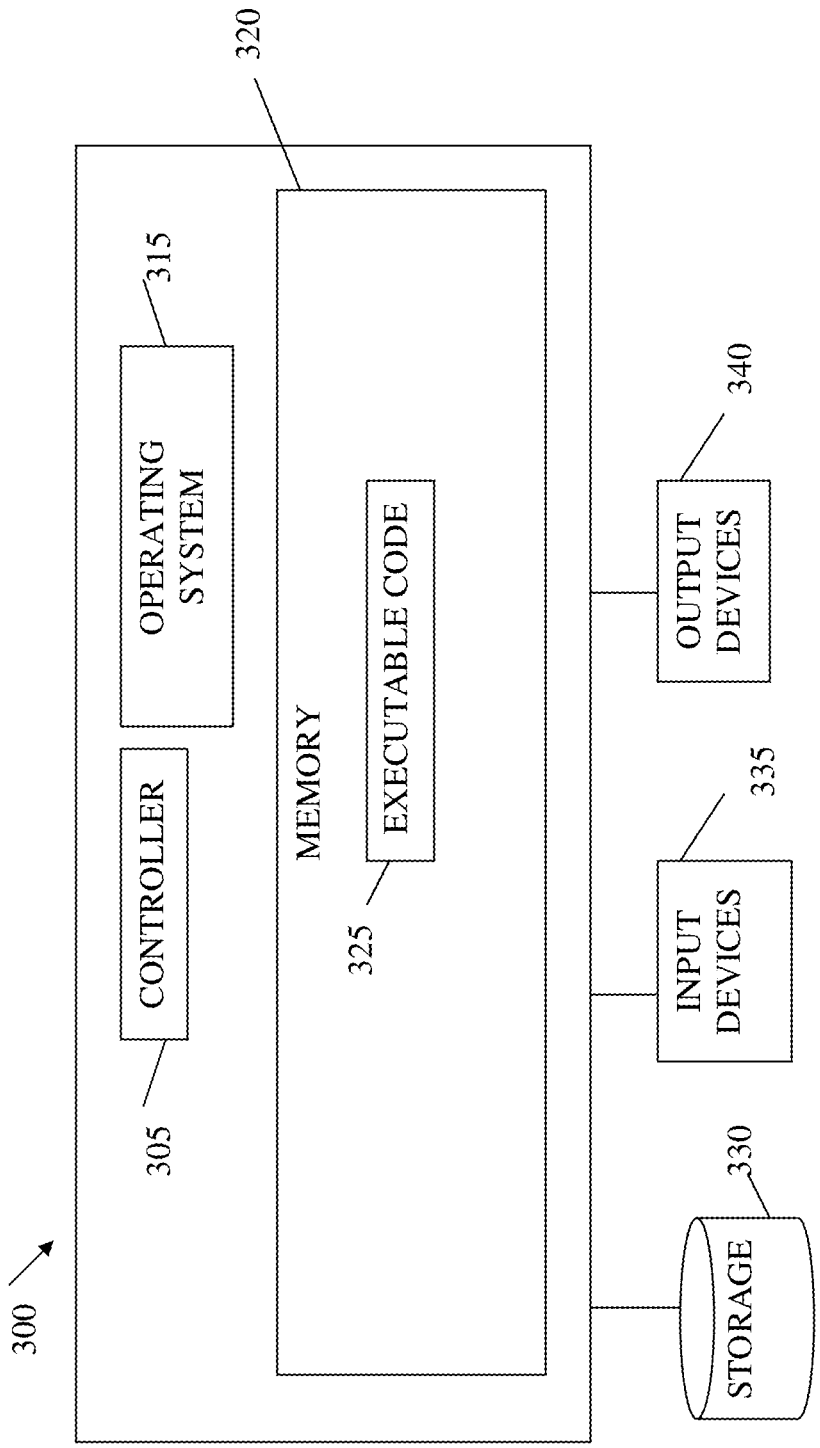
FIG. 7 shows a high-level block diagram of an exemplary computing device according to some embodiments of the present invention.

The system depicted in FIG. 1 may include multiple processors, as each of computers and modules such as servers 4A, 4B, and 4C, hosts 10, installer agent or process 12, calculator services or processes 60, orchestrator 70, and other modules may be, or include, components such as in FIG. 7. Thus, in practice, among a number of processors (typically each associated with a memory), a processor among the processors may determine a subset of hosts to update; another processor (possibly the same processor as the first in some embodiments) among the plurality of processors may determine a set of policies relevant to hosts, perform difference calculations, etc.; and another processor (possibly the same processor as the first and/or second in some embodiments) may install a set of policies relevant to a host. Other combinations of processors and functionalities may be used.

Embodiments may improve the technologies of policy and firewall management by allowing for transparency and scalability of firewall management in large organizations. In a small organization with few hosts to manage, a server and database may provide policies for deployment to hosts. In large scale host management this does not work as well, as each of thousands of hosts may have thousands of policies individually specified for that host, meaning tens of millions of policies may need to be distributed to tens of thousands of hosts. Each policy may control or allow access between the host on which it is installed (in some cases the default is that absent a policy, the host cannot connect to another host), and possibly one other host; thus in such a system each host may need many policies. Embodiments may improve the distribution of such policies, and transparency, by precomputing or pre-filtering network policies relevant to a host, and providing the pre-filtered policies in a file or shared folder or file system, to be fetched by the destination host. By placing relevant policies in a file, and through the use of a shared file system, embodiments may provide transparency, allowing a user to easily see the relevant policies for auditing, troubleshooting, or other purposes. Prior art systems keep such policies in a database, which is more difficult to access and less scalable. As the total number of hosts grows, the tools to update policies (e.g. calculator services or processes 60) may grow with them, providing scalability. This is especially important when hosts are distributed geographically. Embodiments may solve scalability problems by splitting computational targets, e.g. of which hosts get which policies, and database access, from all-at-once across a global system of hosts, to smaller regional needs (e.g. dividing by time zone) and making use of asynchronous communication (e.g. such that policies are fetched from a database, stored in a file, then accessed by a host). In one embodiment, all firewall policy computations for a region may be completed within one hour. Embodiments may improve firewall or policy handling by allowing a history of what policy was installed when to be determined, e.g. via a diff file.

Embodiments may improve the efficiency of computer management technology by not requiring applications to query a centralized database to retrieve Linux host information; rather embodiments may rely on past record to estimate host information, and allow easy troubleshooting of network connectivity issues, since often networking problems result from a network policy being wrongly placed onto a host, e.g. overnight during low use or non-use. In prior approaches host agents directly query a database to fetch network policies, which does not scale: with for example 100,000 hosts and 1,000,000 network policies, a database may become a bottleneck and may result in lagging in network policy retrieval. Embodiments of the present invention may improve on prior art technology with a scalable method by using asynchronous communication, and precomputing of network policies. In one embodiment, when a host needs to refresh its network policy, it may go to a shared disk or data repository to fetch the precomputed result instead of querying a database directly. This may eliminate a bottleneck, resulting in scalability. Embodiments may make network troubleshooting more efficient, as employees may easily determine policy changes, e.g. which may occur overnight.

Figure 2:
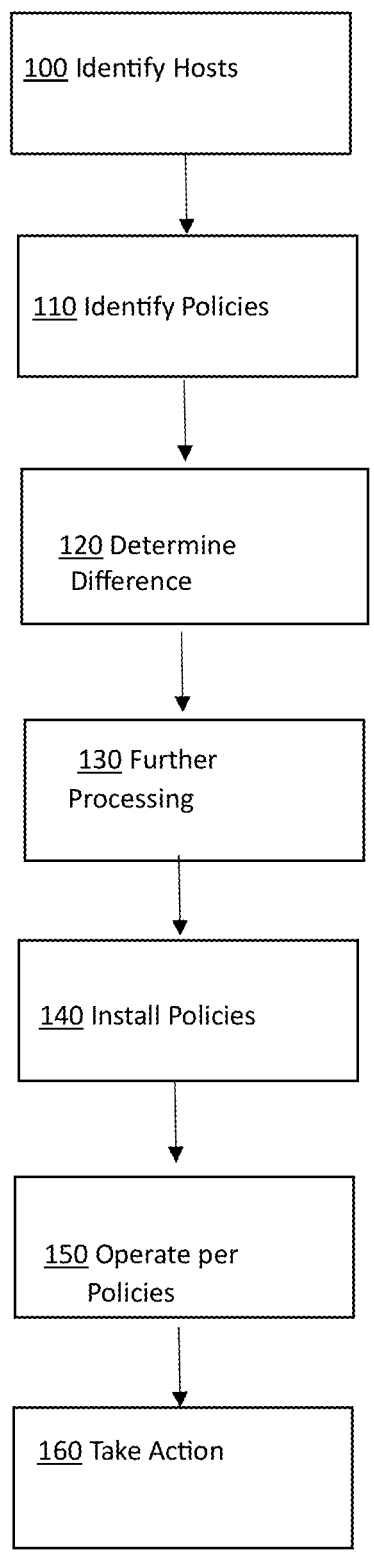
FIG. 2 shows a flowchart of a method according to embodiments of the present invention.

FIG. 2 shows a flowchart of a method according to embodiments of the present invention. The operations of FIG. 2 may be performed by the systems shown in FIG. 1 and other figures shown herein, but other systems may be used. The operations of FIG. 2 may be performed repeatedly, e.g. once per a cycle time period, e.g. once a day.

Referring to FIG. 2, in operation 100, a process may identify or determine a subset of hosts or computing devices, from a larger set of hosts (e.g. all hosts in an organization) to have network policies updated or distributed to, from a set of hosts. This may be termed a calculate process. For example, an orchestrator service such as orchestrator 70 may execute or be triggered, for example periodically, such as an hourly basis. A set of hosts corresponding to a sub-time period within a cycle time period, such as a one-hour time period during an "off peak" time period, e.g. 2-3 AM, may be selected, where the set of hosts resident in the sub-time period changes as the sub-time period occurs at different times around the world. When executed, an orchestrator service may, for example, fetch Linux or other host information from a data store such as CMDB 20, and filter or select those hosts which fit a certain criteria, or receive an appropriately filtered list from a data store. For example, the subset of hosts may be determined based on the time zone corresponding to the location of each host in the subset of hosts: hosts that are, per the data store, located or physically present at a certain local time (e.g. local time 1:00 AM) may be selected. For example, all Linux hosts within region Singapore and Hong Kong may be selected as part of one subset, as these locations are in time zone GMT+8.

The selected subset of hosts (e.g., the identities or identifiers identifying these hosts) may be then transmitted to other processes; for example an orchestrator service may publish the selected Linux hostnames onto message bus 6. In such an example, where all hosts within an organization that reside within a certain time zone are updated at approximately the same time, e.g. at local time 1:00 AM, it may create a natural division by hour to reduce the computer infrastructure burden on accessing update data and updating hosts. While time zones are used as an example method of categorizing or dividing hosts into groups or subsets for updating, in other embodiments other methods may be used. In one embodiment, an orchestrator service automatically starts execution periodically, e.g. every hour, and fetches all hosts identifications from a database such as CMDB 20, then filters and selects hosts in a certain category (e.g. located where local time is 1:00 AM, based on host location information); then publishes the filtered or selected hostnames, e.g. onto a message bus one by one. An orchestrator process may include a list of locations correlated with locations, and use the time of its execution to determine which location to use to filter or select hosts; e.g. an orchestrator may correlate GMT+8 with Singapore and Hong Kong. A sample message published by an orchestrator is {'hostname': 'abc'}, where abc is an enterprise Linux hostname, and each message represents one host. Other methods of transmitting selected hosts to other processes may be used.

In operation 110, for each host in the subset of hosts or computing devices, a process may determine or identify a set of policies or rules relevant to or associated with that host. For example, a calculator service or process 60 may access and consume an individual hostname produced in operation 100 from a message bus, match or correlate the hostname to entries for network policies from a database storing network policies, e.g. by querying database 30 with a hostname, and receive from the database policies or rules relevant to the host. Multiple calculator services or processes 60, each servicing one host at time, may exist and operate substantially concurrently, but these processes may be reused for multiple hosts, after each host is serviced. Calculator processes or services may operate by periodically consuming messages from a message bus, e.g. each calculator process consuming one message every second, process it (e.g. identify policies relevant to a hostname) and move onto the next message. Thus in one embodiment calculator services (and possibly other services discussed herein) are reused for different hosts.

In one embodiment, calculation for a set of hosts occurs before (e.g. one hour before) queries for rules or policies are sent or are expected to be sent from hosts. Calculation may be based on a host list prepared in the prior cycle time period, e.g. the previous day. Other methods of determining policies relevant to a host may be used.

Rules or policies relevant to or to be applied to a host may be those having in the rule or policy the hostname for that host; rules or policies that are designed to work with only that specific host (e.g. determining which other hosts the relevant host may connect with); being indexed to that host (e.g. being stored in a database with an identifier or index which correlates to the host or hostname); rules or policies that are specifically relevant to a single host by sharing a hostname with the host (e.g. in the form of a rule index or label); or those rules or policies otherwise being specified as being used for that particular host. In some embodiments, each rule or policy is indexed or mapped itself, individually, to one unique host and is not applicable to multiple different hosts; however, other indexing or relevancy schemes may be used. Such indexing or association with a host may be part of the rule itself.

Each of a plurality of processes may operate substantially at the same time, at overlapping time periods, or concurrently to determine a set of policies relevant to the subset of hosts. Policies for multiple hosts may be determined concurrently, and multiple calculator or other services may operate concurrently. Thus, in one embodiment, all hosts located in one time zone, or one category, may have their policies determined at the same time or concurrently. Other methods of determining policies to apply to hosts may be used; e.g. a calculator service need not be used.

In one embodiment, a calculator service may communicate policies or rules to a host via a calculator service output. A calculator service may produce, or save the policies to, a file or other data object (e.g. file 42) with the set of policies relevant to the host, which may be a compressed file with computed network policies for a given host, where the file is stored on a shared file system, e.g. on a server such as server 4A or a cloud service. Other methods of transmitting identified policies to hosts may be used.

In operation 120, a difference may be determined or calculated between the set of policies or rules relevant to or associated with the host and a previous set of policies or rules relevant to or associated with that host, which were determined at an earlier time. For example in the case that the periodicity of determining relevant policies is once a day such that a cycle time period is 24 hours, the current or latest policies determined for a specific host in operation 100 may be compared against those determined for that host the previous day (e.g. the immediately preceding cycle time period). In some embodiments, the earlier time may be two time cycles in the past—e.g. two days ago. In some embodiments, a difference file may be saved in the same folder or location as the calculated policies. The difference may be determined by comparing a file containing the set of policies relevant to the host, and a file containing the set of policies relevant to the host determined at an earlier time, e.g. a previous file. The difference file may be saved in a directory or folder indexed by the host and time period, along with one or more files including the set of policies or rules relevant to the host.

In operation 130, further processing on calculated rules or policies may be performed. For example, a simplify process may remove or strip away rule information not needed for certain functionality.

In operation 140, for each of the subset of hosts, the set of policies relevant to or specific to the host may be installed in that host. For example, at a certain standardized time, e.g. 2:00 AM local time to the host, an installer agent or process 12 executing on a host may wake up or be executed and access a file or other data store, e.g. the most recently created file, of rules or policies for the host on which it is executing. E.g., a host, using such an installer process, may contact reader service or process 52 (e.g. executing on a server or cloud system separate from a host) to access or fetch its own network policy file (e.g. associated with or relevant to its host) from a shared file system or another file system, to access policies relevant to the host. It may decompress the file and install accordingly to update policies, for example by replacing, updating or modifying a table such as table 14. The installer process may use, e.g. an iptables-save command to install the rules; other methods may be used. This may occur at a regular time, e.g. in coordination with or shortly after operations 100 and 110. For example, in one implementation, Singapore and Hong Kong servers (as hosts) start to fetch and install network policies at 2:00 AM local time. In some embodiments, a separate reader service need not be used to access a file of rules. In one embodiment, one reader service exists for an organization, servicing thousands of hosts, where the hosts contact the reader service by HTTP request.

A reader service may provide security, authentication, authorization and auditing, and prevent impersonation and information leaks. For example, a host agent calling a reader service may transmit IP address, hostname and a secret key to the reader, which may then verify this information. If verification is successful, the reader returns the correct firewall to that host; if unsuccessful, the reader does not return anything to the host, and may log a warning message and/or raise an alert for enterprise security team to follow up. If a human system administrator calls the reader, the reader may verify the person's identity and permissions, and only if verified does the reader return information re hosts the person can access. For example, in some embodiments a system administrator in department A cannot view firewall rules of hosts in department B.

In operation 150, hosts may operate according to policies. For example, a rule or policy may, when processed by a program such as the iptables utility, prevent or allow, on a packet basis or another basis, connection (e.g. computer data exchange, communication or connection) to one other host. In some embodiments, the default for hosts in such systems may be no connection is allowed to another specific host unless a specific rule allows for it. Rules may have other or different effects.

In operation 160 action may be taken based on the difference files, such as reversing or unwinding a rule or policy installation. For example, in case a user needs to reverse firewall rules to be those of a past date or cycle time period, they may specify that date or period as an input parameter for example to a Linux agent. The agent may in turn contact a reader service to fetch the ruleset from that period accordingly, e.g. from a directory with the appropriate date, and install the rules or policies.

Other operations or series of operations may be used.

While specific modules and servers are described herein as executing specific functions, in other embodiments, the functions described herein may be performed by different modules or hardware.

An embodiment may store, for example at filesystem 40, database 30, or on another system, firewall policy differences between different dates or updates, for example in difference files or another storage structure. In one embodiment, differences may be stored in a shared folder and/or filesystem. For example, in an embodiment where policies are updated daily, a filesystem folder labelled with the date of the update (e.g. /2023-12-30) may store all difference files for that date, and subdirectories for each host (e.g. /2023-12-30/hostname_1; /2023-12-30/hostname_2; etc.) may store, for each host corresponding to or relevant to the subdirectory, files recording the differences of policies between the date corresponding to the main directory and a prior update of policies. In the case that these directories accumulate increasing amounts of directories and files, directories and/or files may be periodically deleted. While in some embodiments, the date is used to calculate and label differences in rule or policy updates, other time markers (e.g. time and date; time; month; etc.) and markers other than time, may be used to calculate and label differences.

A subdirectory for a host may include, for example: a file including all rules or policies for that host (without considering differences), which may be compressed, e.g. using ZIP or other compression; a file with a human-readable description of each rule (e.g. "allow a connection between host A and host B"); and one or more difference files showing the differences of policies between a date such as the date corresponding to the main directory and the date of a prior update of policies. A file showing the difference between rule or policy set A (e.g. in a file) and rule or policy set B (e.g. in a file) may indicate the rules or policies that are changed, new, or deleted in set B compared to set A. These are typically relevant to or applicable to a particular host: for example the differences may show a difference between the set of policies relevant to a certain host and a set of policies relevant to that same host determined at an earlier time. For example, one difference file may record only rules or policies that are new, deleted or updated over the last day (e.g. when comparing a current set of relevant policies with a set of relevant policies determined at an earlier time), and a second difference file may record only rules or policies that are new, deleted or updated over the last two days (in the case that an update over a weekend or short holiday causes problems that are not apparent until the next working day). Other information may be stored; ranges of days of difference beyond two may be used; and other formats may be used, with other directory structures, or not relying on directory structures.

An embodiment may include a calculate stage, a query stage, a preparation stage and a clean stage.

Figure 3:
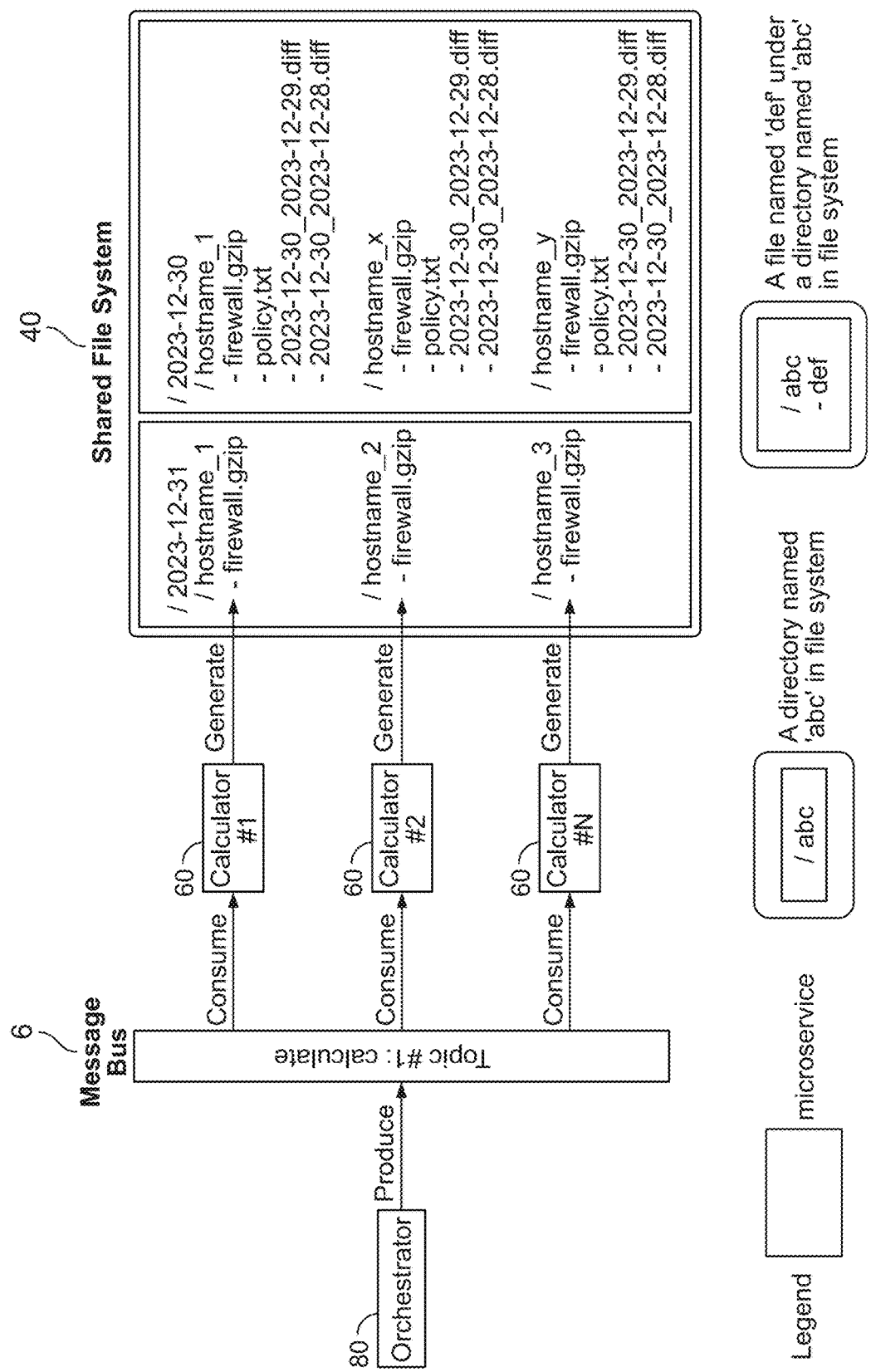
FIG. 3 illustrates a series of operations of a calculate stage, according to some embodiments of the invention.

A calculate stage can be divided into steps such as: calculate, simplify and diff (e.g., compute a difference). FIG. 3 illustrates a series of operations of a calculate stage, according to some embodiments of the invention. Elements in FIG. 3 may be analogous to like-numbered elements in FIG. 1 and other figures shown herein. Referring to FIG. 3, an orchestrator service 70 may be executed or triggered on an hourly basis and may have a list of hosts that will be fetching firewall rules for next period of time, e.g. hour. Orchestrator service 70 may publish selected (e.g., selected as being in a certain time zone, or relevant to a particular sub-time period) Linux hostnames (e.g. one by one) onto message bus 6. A sub-time period that determines a subset of hosts may be based on region. For example, all hosts in a certain region (regardless of time zone) may be updated, for example all hosts residing in New York and New Jersey, or a continent, such as Asia, Europe or North America. Thus hosts in the same region such as continent may have rules calculated at the same time even if they are in different time zones. In such an embodiment, policy or firewall fetch time may still be a certain specific time range per subset of hosts within the region, e.g. 2:00 AM per time zone, or another time having minimum impact on users' daily work.

One or more calculator services 60 may consume individual hostnames from message bus 6, and match network policies from database (for example, network policies matching hostnames may be extracted). The output of each calculator service 60 may be a firewall file, which may be compressed. Compression may be in the gzip format, or other formats. A two-level directory file structure may be created (e.g. by a calculator service) to store firewall files, and may be stored, for example, in shared file system 40. The top-level directory may be named to indicate the current date, and the second level directory may be named to indicate the hostname. For example, if the hostname for a file (e.g. the file includes rules relevant to that hostname) is hostname_1 and the current date is Dec. 31, 2023, then the output directory and file may be /2023-12-31/hostname_1/firewall.gzip.

An embodiment may operate on cycle time periods and sub-time periods, where a process repeats during each cycle time period, and each cycle time period is divided into sub-time periods, where different hosts have policies processed and updated during sub-time periods. For example, a cycle time period may be a day, a 24-hour period, which may be divided into sub-time periods of one hour. In a global system, where at any one time a set of hosts are resident in a time zone which has a local time being a certain update time (e.g. 2:00 AM), the cycle time period of a day may be divided into one-hour sub-time periods corresponding to local time. For example, a set of hosts may have policies updated during the sub-time period corresponding to 2:00-3:00 AM local time.

Figure 4:
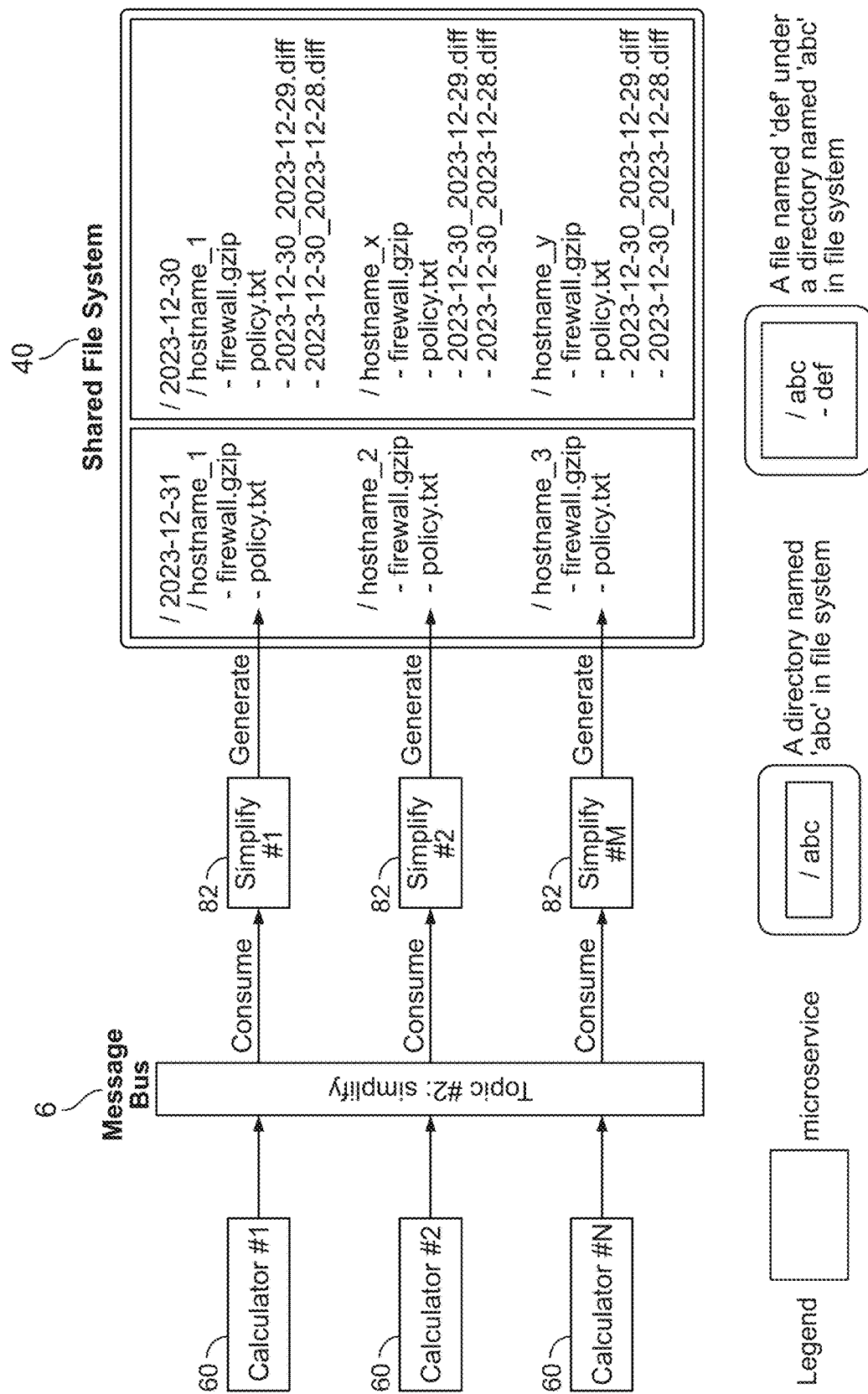
FIG. 4 illustrates a series of operations of a simplify stage, according to some embodiments of the invention.

FIG. 4 illustrates a series of operations of a simplify stage, according to some embodiments of the invention, which may remove or strip away rule information not needed for certain functionality. Elements in FIG. 4 may be analogous to like-numbered elements in FIG. 1 and other figures shown herein. Referring to FIG. 4, a generated firewall file (e.g. firewall.gzip) may contain both policy information and IP information. However, to facilitate production support troubleshooting all that may be needed is the policy information. Sample policy text is shown in Table 1 below:

[63935684] ec_core_infra_tcp_80
A      PRODPERIM_OUTPUT-d      10.113.70.10/31-j ACCEPT
Table 1

Multiple entries (e.g. millions in some cases) as in Table 1 may be included in a firewall.gzip file. In Table 1, the beginning "#" of the first line indicates this line is a comment. 63935684 is policy number, cc_core_infra_tcp_80 is policy or rule name, and 'A PRODPERIM_OUTPUT-d 10.113.70.10/31-j ACCEPT' is the actual IP table rule, which in this specific example is compatible with Linux command iptables. Systems attempting to diagnose which rules or rule changes caused a problem may be more efficient without extraneous information (which may be removed by a simplify process). For example, diagnosis may only require a policy number (e.g. 63935684) and a policy name (e.g. cc_core_infra_tcp_80). Thus a simplify service may input or consume the output of a calculator service (e.g. a firewall.gzip file), and remove or filter out all information such as in Table 1 except for policy or rule number and name. A simplify service may input information as in Table 1 and output, or collect in a file, only "#[63935684] ec_core_infra_top_80" from the input of Table 1 (but may do this for many entries such as in Table 1). A calculator service 60 may publish a firewall file path onto message bus 6 (e.g. with a message bus topic of "#2: simplify") and this may be consumed by one or more simplify service processes 82. More than one simplify service 82 instance or process may be used, e.g. concurrently, to service multiple hosts, each having a rule set to process. The output of a simplify service 82 may be a file (e.g. a text file, or another file) including the rule numbers and rule names for policies installed on the specific host corresponding to or named in the file path, without other information that might be included in a firewall.gzip or other file). Such a file may be placed or stored into the same directory as the firewall file (e.g. containing rules or policies) corresponding to the host corresponding to (or relevant to) the simplify output file, e.g. "policy.txt." For example, if the relevant hostname is hostname_1 and the current date is Dec. 31, 2023, then the output file may have a path/filename of/2023-12-31/hostname_1/policy.txt. Such a file may be a text file. While text files, and files in .txt format, are used as examples herein, files in other formats may be used.

Figure 5:
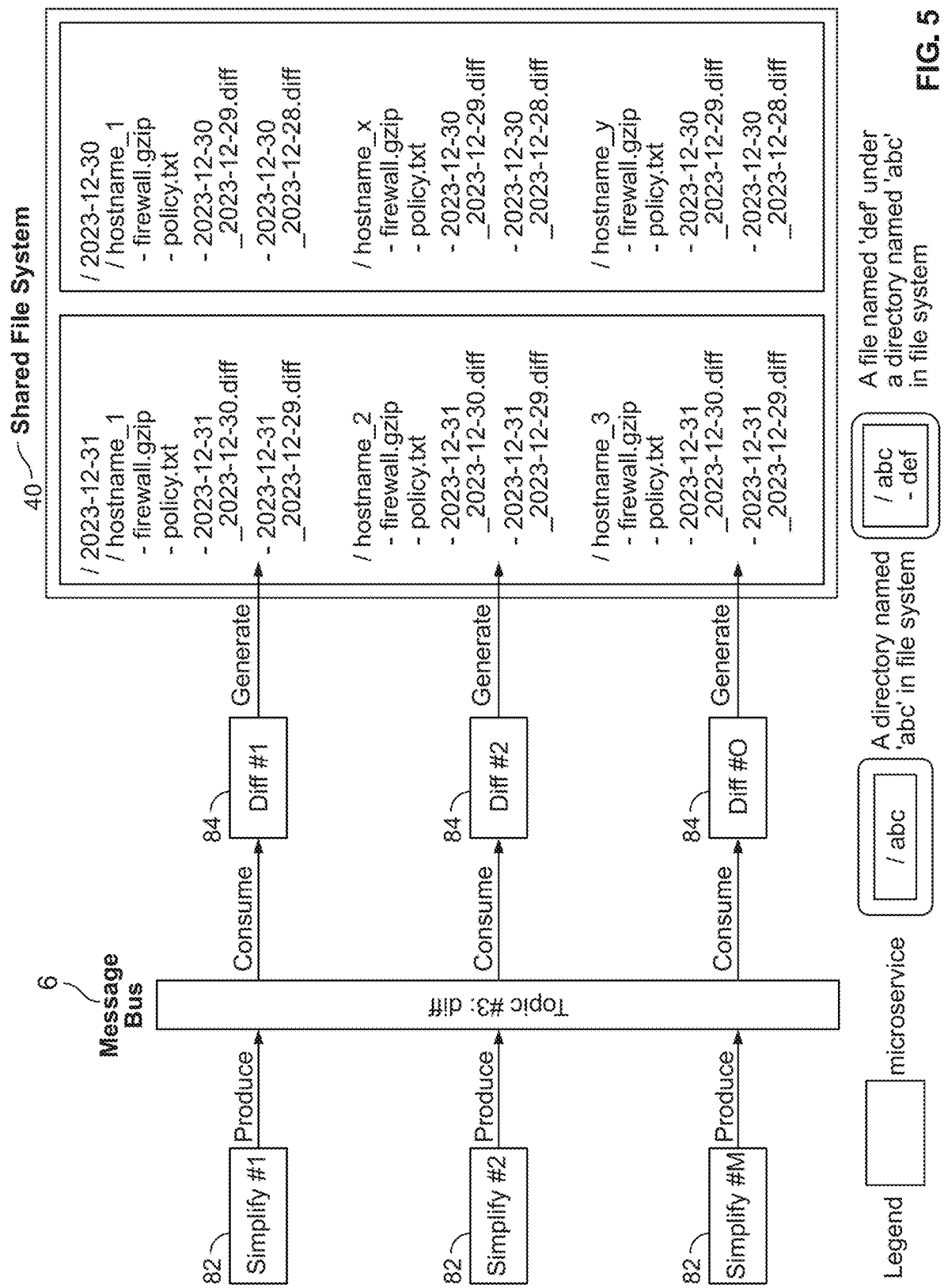
FIG. 5 illustrates a series of operations of a difference stage, according to some embodiments of the invention.

FIG. 5 illustrates a series of operations of a difference stage, according to some embodiments of the invention, which may for example determining a difference between a "current" or most recent set of policies relevant to a host and a set of policies relevant to the host determined at an earlier time, e.g. in a previous time period or day. Elements in FIG. 5 may be analogous to like-numbered elements in FIG. 1 and other figures shown herein. Such a stage may be needed to compare firewall policy differences between different installations (e.g. installed at different times), or between different dates or other times. For example, a user may have used their computer to access a host yesterday, but today she cannot use the computer to access that host. This may be due to firewall rules which have changed, for example overnight. A simplify service 82 may publish a policy or rules onto message bus 6 (e.g. using "topic #3: diff") and this may be consumed by one or more difference services 84. A difference service 84 may compare two sets of policies or rules (e.g. each set in a file, although other storage formats may be used), to calculate or determine a difference between the current or most recent set of policies relevant to the host and a set of policies relevant to the host determined at an earlier time. The difference may be determined by comparing a file containing the set of policies relevant to the host, and a file containing the set of policies relevant to the host determined at an earlier time. For example, the utility "diff", a data comparison tool, may be used to compute differences between the contents of files.

The output of a difference service 84 may be a file, e.g. a text file, including or indicating differences between a current policy (e.g. the latest policy or set of rules to be installed) and a previous policy (e.g. installed at previous times or dates), typically for one specific host only. This difference file may be placed or stored into the same directory as the firewall file (e.g. containing policies or rules relevant to the host). In one embodiment the difference information is saved in a first file, the (e.g. current) set of policies relevant to the host is saved in a second file, and the first file and the second filed are stored in the same directory.

The directory storing the current policies, the difference information, and possibly other information such as simplified policy information may be is indexed by the host relevant to the policies (e.g. "hostname_1" may be included in a directory name) and the time period relevant to the policies (e.g. "2023 Dec. 31" representing Dec. 31, 2023, may be included in a directory name). An example file name for a difference file includes <date>_<previous_date>.diff. For example, in the case that a hostname is named hostname_1 and the current date is Dec. 31, 2023, then the output path and file, corresponding to the hostname, may be 2023 Dec. 31/hostname_1/2023-12-31_2023-12-30.diff. Other nomenclatures for allowing a path or filename to correspond to a host or hostname may be used.

In one embodiment, multiple difference services 84 each consume files to compare from message bus 6 and produce for each comparison a diff file. Typically, the diff files are not distributed to the relevant hosts; rather they may be stored in a central directory structure, e.g. at server 4A.

Example contents of a diff or difference file are shown in Table 2 below:

$ cat 2023 Dec. 31-2023-12-30.diff
0a1
>25154576, Proxy Logging-Inbound
Table 2

The contents of Table 2 indicate that over the night of Dec. 30, 2023, a policy with id=25154576 and name="Proxy Logging-Inbound" was installed on this particular host, which is the host corresponding to or relevant to the file.

Figure 6:
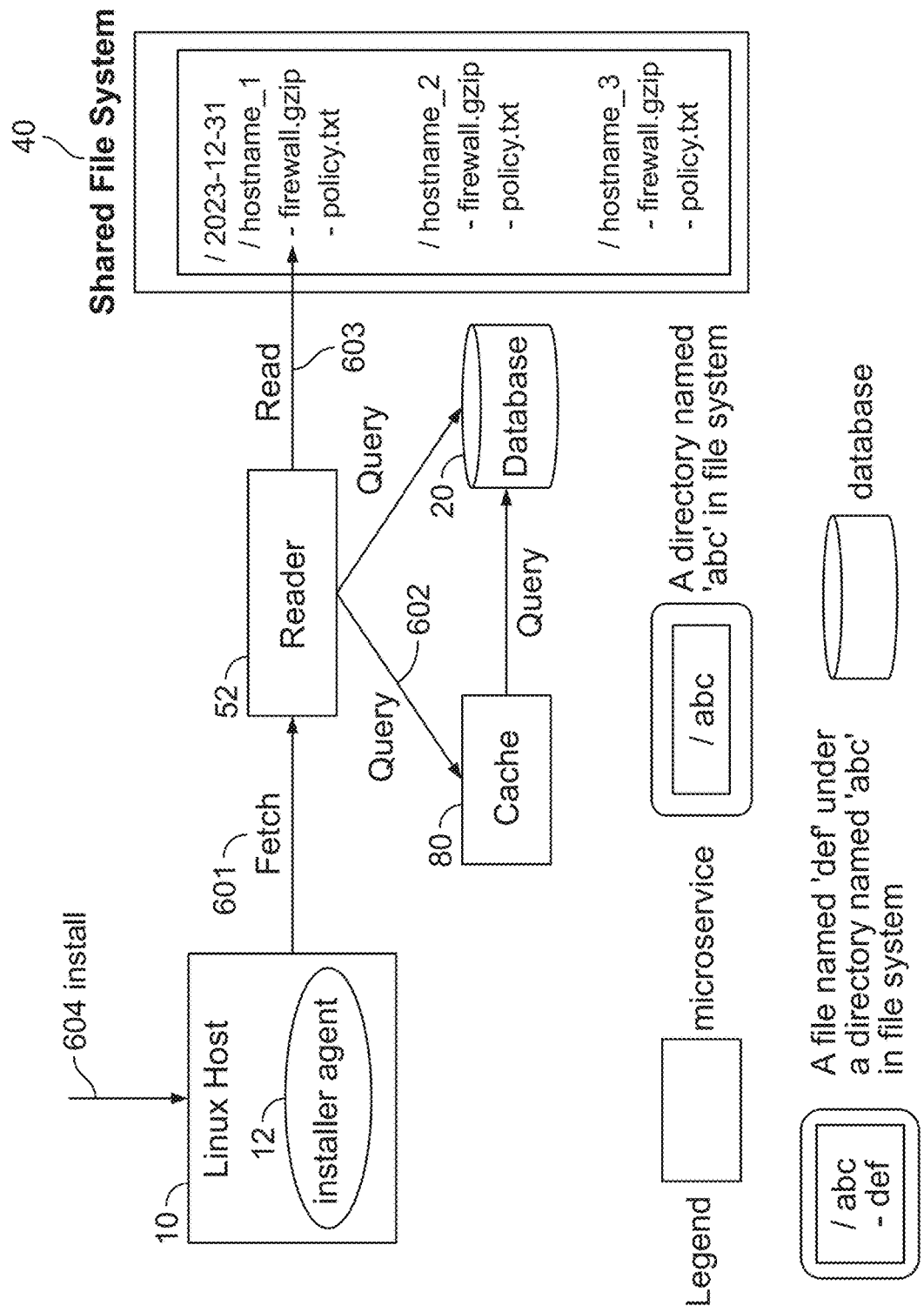
FIG. 6 illustrates a series of operations of an installer or query stage, according to some embodiments of the invention.

FIG. 6 illustrates a series of operations of an installer or query stage, according to some embodiments of the invention. Elements in FIG. 6 may be analogous to like-numbered elements in FIG. 1 and other figures shown herein. Referring to FIG. 6, at operation 601, at a certain time (e.g. the convenient time of 2:00 AM local time), installer agent 12 on a Linux host 10 may wake up and contact reader service 52 to fetch its own corresponding network policy file from the shared file system 40.

At operation 602, upon receiving such request, reader service 52 may first consult a cache service 80 to check if a corresponding firewall or network policy has already been calculated or not. At operation 603, if one has (yes), reader service 52 may combine data such as a current period of time (e.g. current date, and/or current time) and hostname to find the appropriate location (e.g. a directory indexed by time period and hostname) of the relevant firewall file and return the content to or installer agent or process 12 or Linux host 10. In the meantime, reader service 52 may record a note or indication that this host is already queried, or already has made a query for a certain update cycle (e.g. for that day). In one example use case, a database table named, for example, query_record and has three columns: hostname, queried and is_freshman. "Freshman" may indicate a host that is newly seen to the various systems. Reader service 52 may execute a database command, such as the example SQL command such as: "UPDATE query_record SET queried=1 WHERE hostname=<host>". Such a database may be global, recording information on all hosts in an organization, or a different database may be used for each sub-time period. Such a table or tables may be maintained, for example, in CMDB 20.

Embodiments of the invention may account for the case where, in-between the times when a set of hosts (e.g. hosts residing in a certain time zone) is to have rules updated, hosts are added to that set of hosts (e.g. newly installed in an organization) or deleted. Newly added hosts may not be recorded by reader service 52, and reader service 52 may include un-needed entries for hosts that have been deleted.

Reader service 52 may query cache service 80 to determine if a host has rules computed: if cache service returns yes for a certain host (that host has rules computed), then reader service 52 may perform SQL=UPDATE query_record SET queried=1 WHERE hostname=<host>.

If cache service 80 returns no, then reader service 52 may execute SQL=INSERT INTO query_record (hostname, is_freshman) VALUES ('<host>', 1). If, during a cycle of rule updates (e.g. once per cycle time period), a host known to cache service 80 as being assigned to the currently being updated time zone or other grouping (e.g. during a and sub-time period) does not make a query, it can be assumed to be deleted, and may be deleted from cache service 80. Thus, in one embodiment, the determining from a set of hosts, a subset of the hosts to have network policies updated may be based on a table (e.g. maintained at reader service 52), where a host may be added to the table if a query is received from the host and the host is not already in the table; and a host may be removed from the table if a query is not received from the host during a predetermined time period or cycle time period (e.g. during the 24 hour period or cycle time period prior to a calculation being performed for the hosts in the relevant time zone).

After operation 603, if cache service 80 determines the firewall has not been calculated for this host, then reader service 52 may calculate a firewall (e.g. determine rules or policies for the relevant host), possibly on the fly, in real time (e.g. as opposed to being precomputed); and return a result to an installer agent or process 12; and save a record of a hostname into database 30, so that in the next cycle policies for that hostname can be precomputed. A record may be saved to database 30 because one embodiment works on the assumption that if a host needs firewall policy today, then it likely will exist and need that same policy tomorrow, or the next relevant time period. An example corresponding database command, such as an SQL command, may be: "INSERT INTO query_record (hostname, is_freshman) VALUES ('<host>', 1)".

At operation 604, once a host 10 or installer agent or process 12 receives the result from reader service 52, it may then decompress that file and install policies relevant to the host accordingly on host 10. For example, in one example implementation, all Cal and Hong Kong resident hosts 10 (e.g. servers) may start to fetch and install network policy at 2:00 AM their local time.

Operations 601-604 may repeat for a period of time (e.g. the next hour in the case a global system of hosts is divided to operate during a one hour period, the same time in each time zone). A next set of Linux hosts 10, e.g. hosts located in the next time zone to be updated, may have policies processed according to the above example procedure.

A preparation stage may perform tasks such as have an orchestrator process 70 calculate or determine those hosts expected to have policies calculated for them but did not, or hosts who were expected but did not "show up"; calculate a new host list for a current time period (e.g. the current day) by adding those hosts who were expected and had policies determined (e.g. "showed up) and in addition those hosts who did not (e.g. were unexpected) together; and publishing such a combined list of hosts onto message bus (e.g. using "topic #1: calculate"). A preparation stage, and calculating policies based on the information in the preparation stage, may be performed in advance, e.g. in the cycle time period prior to when the policies are used, e.g. 24 hours before. Queries are expected to arrive, in one embodiment, an hour before policies are distributed. These preparation stage tasks may be based on assumptions that 1) if a host needs firewall policy today, then it likely still needs that same policy in the next time period or cycle; and 2) if a host does not need firewall policies today, then it likely will not need them in the next time period or cycle. Such an embodiment may improve prior art systems, which may calculate or prepare policies for a host only in response to a query from the host, which may be time consuming. An embodiment may, instead, maintain a table (e.g. in reader service 52) of hosts that had policies prepared in the previous cycle or time period, and use this table in the current time period to prepare policies for a host in the table in advance of that host sending a query for policies. Removing hosts which do not query in the current time period may lower compute burden for decommissioned hosts. The process may restart with a calculate process with orchestrator 70 being executed or be triggered, for example as in FIG. 2.

For example, Table 3 below shows example hosts A, B, C, D and E which had rule or policy data calculated or prepared for a certain day (e.g. "today); however only host A, B and C queried reader service 52 to refresh firewall rules; whereas hosts D and E did not do so (e.g. did not show up). In addition, in the example, hosts F and G, "appeared" and queried reader service 52 on this same day. As a result, for the next time period (e.g. tomorrow), the preparation list (e.g. stored in the memory of orchestrator 70) may be hosts A. B, C. F and G. A corresponding SQL command for such a situation may be "SELECT hostname FROM query_record WHERE queried=1 OR is_freshman=1".

TABLE 3

| hostname | Queried | is_freshman |
|---|---|---|
| A | 1 | |
| B | 1 | |
| C | 1 | |
| D | 0 | |
| E | 0 | |
| F | | 1 |
| G | | 1 |

A clean stage may include a process such as a microservice that routinely or periodically cleans up, e.g. removes unused data or files from, a directory or other data store that is older than a threshold time, e.g. more than seven days old. During a clean process, an embodiment may delete individual files first then remove the directory that included the deleted files; otherwise there is a chance that some process (e.g. a diff service) still holds an individual file, and as a result the directory cannot be removed immediately. For example, in the sample directory structure in Table 4 below, the general file directory architecture is date→ (subdirectory) hostname→file. In such a case the deletion sequence may be 1. Delete file(s) (e.g., policy.txt etc.)→2. Delete hostname indexed directory (e.g. /hostname_1)→3. Delete date indexed directory (e.g. /2023-12-30)

TABLE 4

```
/2023-12-30
   /hostname_1
     -firewall.gzip
     -policy.txt
     -2023-12-30_2023_12-29.diff
     -2023-12-30_2023-12-28.diff
   /hostname_x
     -firewall.gzip
     -policy.txt
     -2023-12-30_2023_12-29.diff
     -2023-12-30_2023-12-28.diff
   /hostname_y
     -firewall.gzip
     -policy.txt
     -2023-12-30_2023_12-29.diff
     -2023-12-30_2023-12-28.diff
   /hostname_1
      -firewall.gzip
      -policy.txt
      -2023-12-30_2023_12-29.diff
      -2023-12-30_2023-12-28.diff
```

The policies relevant to a host may be indexed with a composite key, for example, a key including the hostname and other information such as the IP address for the host. In a large enterprise, hostnames may not change often but the IP address may change over time. For example, if the enterprise executes a re-organization and some projects, teams or departments move into another department, the hardware inventory, including Linux hosts, might change to a different hardware. This may cause an IP address change of affected Linux hosts. In such an embodiment, when the Linux agent sends a request to a reader service, it may also send its IP address. The reader service may use such a composite key (e.g., hostname+IP address) to check against cache service data, to confirm whether a firewall has been calculated for this host. If yes, a result may be returned from a shared server; if not a calculation may be performed from scratch. When a calculator service calculates firewall rules for a given host, it may also use the previous IP address of that host.

Reference is made to FIG. 7, showing a high-level block diagram of an exemplary computing device according to some embodiments of the present invention. Computing device 300 may include a controller 305 that may be, for example, a central processing unit processor (CPU) or any other suitable multi-purpose or specific processors or controllers, a chip or any suitable computing or computational device, an operating system 315, a memory 320, executable code 325, a storage system 330, input devices 335 and output devices 340. Controller 305 (or one or more controllers or processors, possibly across multiple units or devices) may be configured to carry out methods described herein, and/or to execute or act as the various modules, units, etc. for example when executing code 325. More than one computing device 300 may be included in, and one or more computing devices 300 may be, or act as the components of, a system according to embodiments of the invention. Various components, computers, and modules of FIG. 1 may be or include devices such as computing device 300, and one or more devices such as computing device 300 may carry out functions such as those described in FIGS. 2-6.

Operating system 315 may be or may include any code segment (e.g., one similar to executable code 325) designed and/or configured to perform tasks involving coordination, scheduling, arbitration, controlling or otherwise managing operation of computing device 300, for example, scheduling execution of software programs or enabling software programs or other modules or units to communicate.

Memory 320 may be or may include, for example, a Random Access Memory (RAM), a read only memory (ROM), a Dynamic RAM (DRAM), a double data rate (DDR) memory chip, a Flash memory, a volatile memory, a non-volatile memory, a cache memory, or other suitable memory or storage units. Memory 320 may be or may include a plurality of, possibly different memory units. Memory 320 may be a computer or processor non-transitory readable medium, or a computer non-transitory storage medium, e.g., a RAM.

Executable code 325 may be any executable code, e.g., an application, a program, a process, task or script. Executable code 325 may be executed by controller 305 possibly under control of operating system 315. For example, executable code 325 may configure controller 305 to act as a calculator service, orchestrator, difference calculator, simplify services or other module, or to access, filter, distribute and/or install policies, to act as a host or a server, and perform other methods as described herein. Although, for the sake of clarity, a single item of executable code 325 is shown in FIG. 7, a system according to some embodiments of the invention may include a plurality of executable code segments similar to executable code 325 that may be loaded into memory 320 or another non-transitory storage medium and cause controller 305, when executing code 325, to carry out methods described herein.

Storage system 330 may be or may include, for example, a hard disk drive, a CD-Recordable (CD-R) drive, a universal serial bus (USB) device or other suitable removable and/or fixed storage unit. Data such as policies may be stored in storage system 330 and may be loaded from storage system 330 into memory 320. Some of the components shown in FIG. 7 may be omitted. Although shown as a separate component, storage system 330 may be embedded or included in memory 320.

Input devices 335 may be or may include a mouse, a keyboard, a microphone, a touch screen or pad or any suitable input device. Any suitable number of input devices may be used as shown by block 335. Output devices 340 may include one or more displays or monitors, speakers and/or any other suitable output devices. Any suitable number of output devices may be used as shown by block 340. Any applicable input/output (I/O) devices may be connected to computing device 300 as shown by blocks 335 and 340. For example, a wired or wireless network interface card (NIC), a printer, a universal serial bus (USB) device or external hard drive may be included in input devices 335 and/or output devices 340.

In some embodiments, device 300 may include or may be, for example, a personal computer, a desktop computer, a laptop computer, a workstation, a server computer, a network device, or any other suitable computing device.

In the description and claims of the present application, each of the verbs, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for updating network policies, the method comprising:

for each host in a subset of hosts, determining a plurality of policies relevant to the host, wherein each policy of the plurality of policies permits or prevents a network connection between the host and one or more computer systems, and determining a difference between the plurality of policies relevant to the host and a plurality of policies relevant to the host determined at an earlier time, wherein the determining of the difference comprises, for each host in the subset of hosts, by a corresponding difference service of a plurality of difference services:

generating a difference file, the difference file recording deleted policies; and storing the generated difference file in a directory storing the plurality of policies relevant to the host;

wherein the difference service for the host consumes files to compare from a message bus, the files to compare output by a corresponding simplify service for the host, the simplify service for the host filtering information from a compressed policy file, the compressed policy file comprising the plurality of policies relevant to the host; and for each host in the subset of hosts, installing the plurality of policies relevant to the host.

2. The method of claim 1, wherein the difference is determined by comparing a file containing the plurality of policies relevant to the host, and a file containing the plurality of policies relevant to the host determined at an earlier time.

3. The method of claim 1, wherein:

the difference is saved in a first file; and the plurality of policies relevant to the host is saved in a second file; and the first file and the second file are stored in the same directory.

4. The method of claim 3, wherein the directory is indexed by the host relevant to the policies and the time period relevant to the policies.

5. The method of claim 1 comprising:
determining, from a set of hosts, a subset of hosts to have policies updated, the determining based on a table;
adding a host to the table if a query is received from the host; and
removing a host from the table if a query is not received from the host during a predetermined time period.

6. The method of claim 1, wherein the subset of hosts is determined based on the time zone corresponding to the location of each host in the subset of hosts.

7. The method of claim 1, wherein a policy relevant to a host is a policy that is designed to work with the host.

8. A system for updating network policies, the system comprising:
at least one memory; and
a plurality of processors, wherein:
at least one processor among the plurality of processors is configured to for each host in the subset of hosts, determine a plurality of policies relevant to the host, wherein each policy of the plurality of policies permits or prevents a network connection between the host and one or more computer systems, and determine a difference between the plurality of policies relevant to the host and a plurality of policies relevant to the host determined at an earlier time, wherein the determining of the difference comprises, for each host in the subset of hosts, by a corresponding difference service of a plurality of difference services:
generating a difference file, the difference file recording deleted policies; and
storing the generated difference file in a directory storing the plurality of policies relevant to the host;
wherein the difference service for the host consumes files to compare from a message bus, the files to compare output by a corresponding simplify service for the host, the simplify service for the host filtering information from a compressed policy file, the compressed policy file comprising the plurality of policies relevant to the host; and
for each host in the subset of hosts, at least one processor among the plurality of processors is configured to install the plurality of policies relevant to the host.

9. The system of claim 8, wherein the difference is determined by comparing a file containing the plurality of policies relevant to the host, and a file containing the plurality of policies relevant to the host determined at an earlier time.

10. The system of claim 8, wherein:
the difference is saved in a first file; and
the plurality of policies relevant to the host is saved in a second file; and
the first file and the second file are stored in the same directory.

11. The system of claim 10, wherein the directory is indexed by the host relevant to the policies and the time period relevant to the policies.

12. The system of claim 8 wherein at least one processor among the plurality of processors is configured to:
determine, from a set of hosts, a subset of hosts to have policies updated, the determining based on a table;
add a host to the table if a query is received from the host; and
remove a host from the table if a query is not received from the host during a predetermined time period.

13. The system of claim 8, wherein the subset of hosts is determined based on the time zone corresponding to the location of each host in the subset of hosts.

14. The system of claim 8, wherein a policy relevant to a host is a policy that is designed to work with the host.

15. A method for distributing network rules, the method comprising:
determining for each of a set of hosts, a plurality of rules to be applied to the host, wherein each rule of the plurality of rules permits or prevents a network connection between the host and one or more computer systems, and determining a difference between the plurality of rules to be applied to the host and a previous plurality of rules to be applied to the host, wherein the determining of the difference comprises, for each host in the set of hosts, by a corresponding difference service of a plurality of difference services:
generating a difference file, the difference file recording deleted rules; and
storing the generated difference file in a directory storing the plurality of rules to be applied to the host;
wherein the difference service for the host consumes files to compare from a message bus, the files to compare output by a corresponding simplify service for the host, the simplify service for the host filtering information from a compressed rule file, the compressed rule file comprising the plurality of rules to be applied to the host; and
for each host of the set of hosts, installing the plurality of rules to be applied to the host.

16. The method of claim 15, wherein the difference is determined by comparing a file containing the plurality of rules to be applied to the host, and a previous file of rules to be applied to the host.

17. The method of claim 15, wherein:
the difference is saved in a first file; and
the plurality of rules to be applied to the host is saved in a second file; and
the first file and the second file are stored in the same directory.

18. The method of claim 17, wherein the directory is indexed by the host relevant to the rules and the time period relevant to the rules.

19. The method of claim 15 comprising:
determining, from a set of hosts, a subset of hosts to have rules updated, the determining based on a table;
adding a host to the table if a query is received from the host; and
removing a host from the table if a query is not received from the host during a predetermined time period.

20. The method of claim 15, wherein a rule to be applied to a host is a rule that is designed to work with the host.

* * * * *